United States Patent [19]

Mark

[11] 4,104,246
[45] Aug. 1, 1978

[54] NON-OPAQUE FLAME-RETARDANT POLYCARBONATE COMPOSITION

[75] Inventor: Victor Mark, Evansville, Ind.

[73] Assignee: General Electric Company, Pittsfield, Mass.

[21] Appl. No.: 733,002

[22] Filed: Oct. 15, 1976

[51] Int. Cl.$^2$ ................................................ C08K 5/42
[52] U.S. Cl. ........................ 260/45.7 S; 260/45.9 KA; 260/45.9 E
[58] Field of Search ........................ 260/45.7 S, 45.9 R

[56] References Cited
U.S. PATENT DOCUMENTS 3,926,908   5/1919   Mark ................................ 260/45.7 S

OTHER PUBLICATIONS

Kirk–Othmer, Encyclopedia of Chem. Techn. (2nd ed.), vol. 17, 1968, Interscience, N. Y., pp. 213–215.
Encyclopedia of Polymer Science & Techn., vol. 9, 1968, Interscience, N.Y., pp. 525–527 & 530.

*Primary Examiner*—V. P. Hoke
*Attorney, Agent, or Firm*—Salvatore C. Mitri; William F. Mufatti

[57] ABSTRACT

A non-opaque flame-retardant polycarbonate composition comprising in admixture an aromatic carbonate polymer and an additive which may be the metal salts of sulfonic acids of aromatic ketones; said aromatic carbonate polymer and additive having a refractive index in the range of 1.54 to 1.65.

14 Claims, No Drawings

NON-OPAQUE FLAME-RETARDANT POLYCARBONATE COMPOSITION

This invention is directed to a non-opaque flame-retardant polycarbonate composition and in particular an aromatic polycarbonate containing in admixture therewith an additive which may be the metal salts of sulfonic acids of aromatic ketones and mixtures thereof wherein said aromatic polycarbonate and additive have a refractive index in the range of 1.54 to 1.65 and articles therefrom.

BACKGROUND OF THE INVENTION

With the increasing concern for safety, there is a positive move toward providing safe materials for public and household use. One particular area of need is that of providing flame-resistant or flame-retardant non-opaque products for use by the ultimate consumer. As a result of this demand, many products are being required to meet certain flame-retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame-retardant additives which are employed by mixing with products to render such materials self-extinguishing or flame retardant. Such flame-retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame-retardant additives with base product polycarbonate resins. Many of these known additives have a degrading effect upon the polymer.

In many instances, it is desirable that articles produced from these fire retardant polycarbonate resins retain their non-opaque characteristics.

From U.S. Pat. No. 3,926,908 to Victor Mark issued Dec. 16, 1975, flame-retardant polycarbonate compositions comprising in admixture, an aromatic carbonate polymer and a flame-retardant additive which may be the metal salts of sulfonic acids of aromatic ketones is disclosed.

DESCRIPTION OF THE INVENTION

It has now been surprisingly discovered that an aromatic polycarbonate can be made flame retardant while retaining its non-opaque characteristics by incorporating with the aromatic polycarbonate 0.001 to about 2.0 parts per hundred parts of aromatic polycarbonate of certain additives, which additives are inert, do not degrade the aromatic polycarbonate and also retain the non-opaque characteristics of the polycarbonate composition.

The shaped article of the present invention is that comprising an aromatic carbonate polymer and from 0.001 to about 2.0 parts per hundred parts of aromatic carbonate polymer of an additive selected from the group consisting of the metal salts of substituted and unsubstituted sulfonic acids of aromatic ketones, and mixtures thereof, wherein said metal salts are selected from the group consisting of alkali metals and alkaline earth metals, and mixtures of these metal salts, and said substituent on the metal salt of the substituted sulfonic acids of aromatic ketones is selected from the group consisting of electron withdrawing radicals and mixtures of electron withdrawing radicals wherein the shaped article has a refractive index in the range of 1.54 to 1.65. Particularly preferred shaped articles are in the form of a sheet and a pellet.

The refractive indices of the materials herein are determined by the immersion method as described in *Physical Methods of Organic Chemistry*, by Arnold Weissberger, Interscience Publishers, Volume II, 1960 (page 1433).

When the refractive index of the instant additives is in the range of the refractive index of the aromatic carbonate polymer, i.e., 1.54 to 1.65, the polycarbonate composition and shaped article produced therefrom is non-opaque. This means that it is able to transmit light and is from translucent to transparent. Depending upon how close the refractive index of the additive is to that of the polycarbonate, this will determine whether the resulting composition is transparent or translucent. If the additive at the concentration employed is partially or totally soluble in the polycarbonate polymer, the more transparent the composition and resulting article will be.

More specifically, the particular additive of this invention is the metal salt of substituted and unsubstituted sulfonic acids of aromatic ketones and mixtures thereof. The metal salt employed in the practice of this invention is either the alkali metal or alkaline earth metal salt or mixtures of these metal salts. The metals of these groups are sodium, lithium, potassium, rubidium, cesium, beryllium, magnesium, calcium, strontium and barium.

The sulfonic acids of aromatic ketones employed in the practice of this invention are substituted or unsubstituted sulfonic acids of aromatic ketones wherein the substituent consists of an electron withdrawing radical. As employed herein and within the scope of this invention, any of the electron withdrawing radicals can be employed in the practice of this invention. However, preferably, the electron withdrawing radical or substituent employed in the practice of this invention is the halo-, nitro-, trihalomethyl and cyano electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely, electrons, but still remains covalent and does not form an ion. This is an extremely brief description of this phenomenon and is merely set forth here to describe the electron withdrawing effect. Reference should be made to the texts set forth above.

In the practice of this invention the metal salt of the sulfonic acid of an aromatic ketone can best be represented by the following formula:

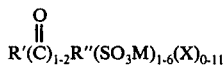  I.

wherein x is an electron withdrawing radical, M is a metal which may be selected from the periodic table of either an alkali metal or an alkaline earth metal and R' and R" may be either an aryl radical of 1–2 aromatic rings or an aliphatic radical of 1–6 carbon atoms and they may be the same or different. It is to be understood, however, that R' and R" together must contain at least one aromatic ring. Also, as shown in the above Formula I, the additive may or may not have an electron withdrawing radical. For optimum results, it is preferred that the additive contain an electron withdrawing radical, and that both the carboxyl radical and the ($SO_3M$) radical be on the same aromatic ring.

Actually, while there are many compounds that meet the requirements of Formula I and which offer excellent flame-retardant characteristics to an aromatic polycarbonate, the preferred additive employed is potassium 4-chlorobenzophenone-3-sulfonate. This has the following formula:

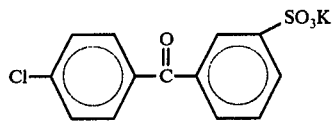

The compositions of the instant invention may contain fillers, pigments, dyes, antioxidants, stabilizers, ultraviolet light absorbers, mold release agents and other additives commonly employed in non-opaque polycarbonate resin formulations. Furthermore, the shaped articles may be coated with, for example, maror scratch-resistant coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I 100 parts of an aromatic polycarbonate, prepared by reacting 2,2-bis(4-hydroxyphenyl) propane and phosgene in the presence of an acid acceptor and a molecular wieght regulator and having an intrinsic viscosity of 0.57 is mixed with 0.10 part of a finely ground dehydrated additive listed in Table I by tumbling the ingredients together in a laboratory tumbler. The resulting mixture is then fed to an extruder, which extruder is operated at about 265° C, and the extrudate is comminuted into pellets.

The pellets are then injection molded at about 315° C into test bars of about 5 in. by ½ in. by about 1/16-⅛ in. thick into test squares of about 2 in. by 2 in. by about ⅛ in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"V-II": Average flame and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other 4 are classified as V-O, then the rating for all 5 bars is V-II.

The test squares are tested for light transmission in a Gardner XL 10-CDM instrument. The data shows the amount of incident light transmitted by the test squares using air as 100% transmission.

The results of the different additives within the scope of the instant invention are as follows with a control being the aromatic polycarbonate as prepared above without the additive of the type set forth herein.

TABLE 1

| Additive (0.10 parts per hundred) | Light Transmission (%) | Flame Out Time Seconds | No. of Drips Per five test bars | UL-94 Rating |
| --- | --- | --- | --- | --- |
| CONTROL | 86 | 26 | 13 | Burning |
| Potassium benzophenone-3-sulfonate | 78 | 5.6 | 0 | V-I |
| Potassium 4-chlorobenzophenone-3-sulfonate | 76 | 3.3 | 0 | V-O |
| Sodium acetophenone-3-sulfonate | 70 | 8.9 | 3 | V-II |
| Barium 2,3-dichloronaphthoquinone-6-sulfonate | 72 | 4.4 | 0 | V-O |

EXAMPLE II

This Example is set forth to demonstrate the effect of the additives of this invention at limits of 0.50 parts per hundred parts of the polycarbonate.

In preparing the test specimens for this Example, 100.00 parts of the polycarbonate of Example I is mixed with 0.50 parts of the additive listed in TABLE 2 employing the same procedure. Test specimens are then molded using the same procedure employed in Example I. The test specimens are subjected to the same test procedure of Example I with the following results.

TABLE 2

| Additive (0.50 parts per hundred) | Light Transmission (%) | Flame Out Time Seconds | No. of Drips Per five test bars | UL-94 Rating |
|---|---|---|---|---|
| CONTROL | 86 | 26 | 13 | Burning |
| Sodium 2,3-dichloronaphthoquinone-6-sulfonate | 60 | 4.0 | 0 | V-O |

EXAMPLE III

This Example is set forth to show the effect of a known commercially available flame-retardant additive.

Example I is repeated except that in place of the additives employed therein, only 1 part decabromodiphenyl ehter is used herein. The results obtained upon evaluating 5 tests bars are the same as obtained for the Control shown in TABLE 1 above.

In the practice of this invention, aromatic carbonate polymers are rendered flame rttardant by the addition of certain particular additives which are the metal slats of substituted and unsubstituted sulfonic acids of aromatic ketones and which includes mixtures of these additives of substituted and unsubstituted sulfonic acids of aromatic ketones as well as mixtures of the metal salts. The amount of the additives employed in the practice of this invention may vary from 0.001 to up to about 2.0 weight percent.

As indicated previously, the additive of the instant invention comprises the alkali or alkaline earth metal salts of the substituted and unsubstituted sulfonic acids of aromatic ketones and mixtures of these. While a number of such salts are set forth in the tables of the Examples of the instant invention, these are only a representative sample of the additives of this invention. The sodium, calcium, magnesium, potassium, strontium, lithium, barium, rubidium and cesium salts of other sulfonic acids of aromatic ketones can be employed in place of those of the Examples with the same effective flame retardancy being achieved. These other metal salts of sulfonic acids of aromatic ketones include:

benzophenone-4,4'-disulfonic acid, disodium salt
benzil-4,4'-disulfonic acid, dipotassium salt
di(-αnapththylketone) sulfonic acid, calcium salt
tetrachlorophenanthrenequinonedisulfonic acid, disodium salt
pentachlorophenyl-α-naphthylketone-5-sulfonic acid, lithium salt
4-acetylbenzophenone-4'-sulfonic acid, calcium acid.

In the practice of this invention, the additive is generally prepared by well known methods in the art. For example, one such well known method involves taking an aromatic ketone such as benzophenone and subjecting it to sulfonation using either sulfuric acid, chlorosulfonic acid, fuming sulfonic acid or sulfur trioxide. These reactions can be carried out at room temperature or at elevated temperatures such as about 50° C. The salt is then prepared by adding the proper alkaline reagent in sufficient amount to make the neutral salt. The salt is then recovered by precipitation or by distillation of the solvent.

In the case of a trihalomethyl electron withdrawing substituent, such as trifluoromethyl electron withdrawing substituent for example, it is best to start with the prepared trifluoromethyl aromatic ketone and then sulfonate as above, as well as preparing the salt thereof.

In the practice of this invention, any of the aromatic polycarbonates can be employed herein having a refractive index in the range of 1.54 to 1.65. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'tetrabromo-4,4'-dihydroxydiphenyl) propane, (3,3'-dichloro-4,4'-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their haloformyl derivatives.

Also, included herein are blends of a linear polycarbonate and a branched polycarbonate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. In a flame-retardant aromatic carbonate polymer composition comprising in admixture an aromatic carbonate polymer and an additive selected from the group consisting of the metal salts of substituted and unsubstituted sulfonic acids of aromatic ketones and mixtures thereof, wherein said metal salts are selected from the group consisting of alkali metals and alkaline earth metals, and mixtures of these metal salts, and said substituent on the metal salt of the substituted sulfonic acids of aromatic ketones is selected from the group consisting of electron withdrawing radicals and mixtures of electron withdrawing radicals; the improvement comprising including said additive in said admixture in an amount of from 0.001 to about 2.0 parts per hundred parts of the aromatic carbonate polymer, said aromatic carbonate polymer and said additive each having a refractive index in the range of 1.54 to 1.65 such that said composition is non-opaque.

2. In a shaped article comprising in admixture an aromatic carbonate polymer and an additive selected from the group consisting of the metal salts of substituted and unsubstituted sulfonic acids of aromatic ketones and mixtures thereof, wherein said metal salts are selected from the group consisting of alkali metal and alkaline earth metals, and mixtures of these metal salts, and said substituent on the metal salt of the substituted sulfonic acids of aromatic ketones is selected from the group consisting of electron withdrawing radicals and mixtures of electron withdrawing radicals, the improvement comprising including said additive in said admixture in an amount of from 0.001 to about 2.0 parts per hundred parts of said aromatic carbonate polymer, said additive and said aromatic carbonate polymer each having a refractive index in the range of 1.54 to 1.65 such that said article has a refractive index in the range of 1.54 to 1.65 and is non-opaque.

3. The shaped article of claim 2 wherein the metal salt of the substituted and unsubstituted sulfonic acids of aromatic ketones have the following formula:

wherein R' and R" are independently selected from the group consisting of aryl radicals of 1–2 aromatic rings and an aliphatic radical of 1–6 carbon atoms, provided, however, that R' and R" must contain at least one aromatic radical, and wherein M is a metal selected from the group consisting of alkali metals and alkaline earth metals and X is an electron withdrawing radical.

4. The shaped article of claim 3 wherein the electron withdrawing radical is selected from the group consisting of halo-, nitro-, trihalomethyl- and cyano- radicals and mixtures thereof.

5. The shaped article of claim 3 wherein X is chlorine.

6. The shaped article of claim 3 wherein R' and R" are aryl radicals of one aromatic ring each.

7. The shaped article of claim 3 wherein M is calcium.

8. The shaped article of claim 2 wherein the metal salt is potassium-4-chlorobenzophenone-3-sulfonate.

9. The shaped article of claim 2 wherein the metal salt is potassium benzophenone-3-sulfonate.

10. The shaped article of claim 2 wherein the metal salt is sodium acetophenone-3-sulfonate.

11. The shaped article of claim 2 wherein the metal salt is barium 2,3-dichloronaphthoquinone-6-sulfonate.

12. The shaped article of claim 2 wherein the metal salt is sodium 2,3-dichloronaphthoquinone-6-sulfonate.

13. The shaped article of claim 2 in the form of a sheet.

14. The shaped article of claim 2 in the form of a pellet.

* * * * *